Aug. 19, 1958     H. W. DARR     2,847,775
NAME PLATE FOR STORAGE BATTERIES
Filed Aug. 10, 1956
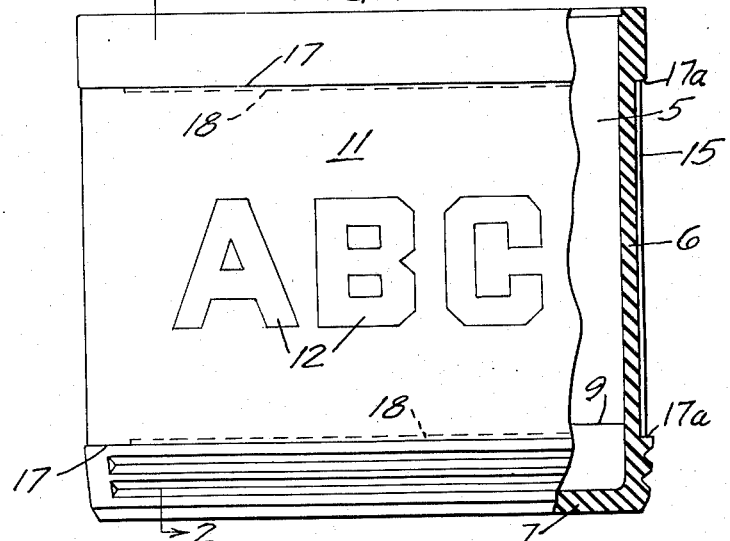
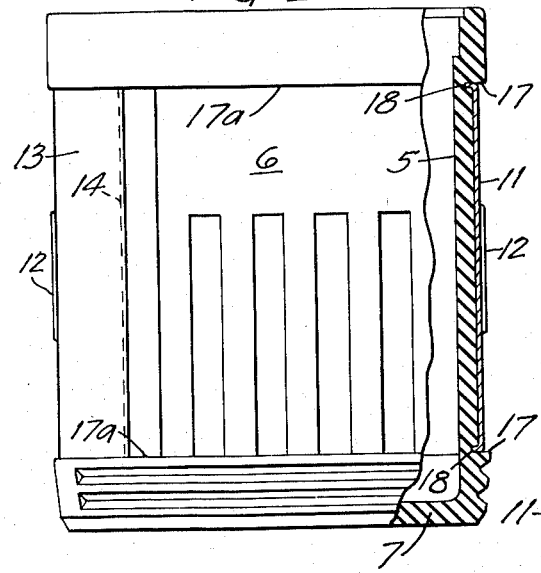
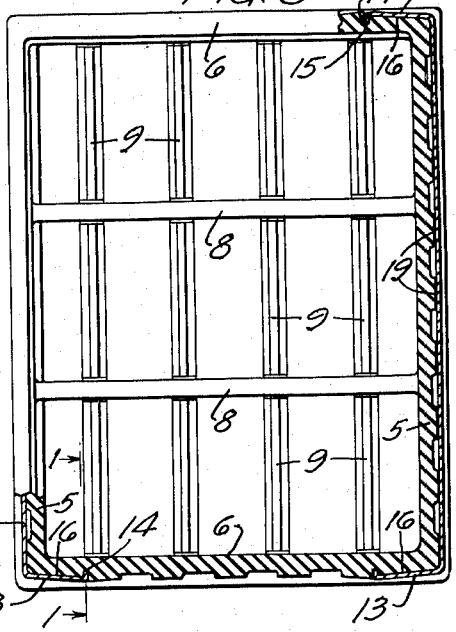
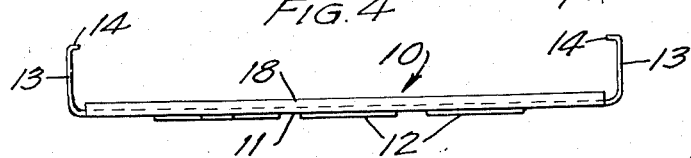
INVENTOR.
HAROLD W. DARR
BY
ATTORNEY United States Patent Office 2,847,775
Patented Aug. 19, 1958

2,847,775

NAME PLATE FOR STORAGE BATTERIES

Harold W. Darr, Minneapolis, Minn., assignor to Gould-National Batteries, Inc., St. Paul, Minn., a corporation of Delaware Application August 10, 1956, Serial No. 603,281

1 Claim. (Cl. 40—2.2)

This invention relates to name plates for storage batteries and has for its principal object the provision of a name plate which is adapted to be sprung into place on a storage battery container of suitable construction and to be securely held in place without the use of adhesives or other conventional fastening means.

My invention also includes certain other novel features of construction which will be more fully pointed out in the following specification and claim.

Some of the larger manufacturers of storage batteries market their batteries under a number of different trademarks or brands through outlets such as chain stores, wholesalers and jobbers. Many of these outlets sell under private brands and the manufacturer is required to display the several brands and descriptive matter on the battery containers for a wide range of sizes and types of batteries. A particular brand or trademark and the associated descriptive matter may be molded or embossed directly on the containers of the batteries for accounts marketing large numbers of batteries. For other accounts, the sales volume makes it economically unsound to provide special containers with the brands molded or embossed thereon. For such accounts it is customary to attach flat or embossed labels, sometimes called "wafers," showing the identifying data. Such labels are usually set in recesses in the containers and have heretofore been held in place by adhesive or by members such as acid resistant screws. Both of these methods of attaching the labels are time consuming and add materially to the cost of the battery. By the present invention, I greatly reduce the time required for attaching the name plates and I also reduce the cost of attaching them, while affording more secure and permanent attachment of the plates.

Referring to the accompanying drawing which illustrates, by way of example and not for the purpose of limitation, a preferred embodiment of my improved name plate together with a storage battery container of suitable construction:

Figure 1 is a part front elevational view and part vertical sectional view taken on the line 1—1 of Fig. 3, showing a pair of my improved name plates in place on the battery container;

Fig. 2 is a part end elevational view and part vertical sectional view taken on the line 2—2 of Fig. 1;

Fig. 3 is a part top plan view and part horizontal sectional view showing the container and a pair of name plates in place thereon, and Fig. 4 is a plan view showing details of one of my improved name plates separate from the battery container.

In the drawing the illustrated battery container is a modified form of one type in general use. Such containers are usually molded from a hard rubber or asphalt composition or from a suitable synthetic resin, e. g., polystyrene. As shown, it has similar, parallel substantially vertical walls 5 extending at right angles to end walls 6 and a bottom 7. Further in accordance with conventional construction, the container is divided by partitions 8 into a plurality of cells, each adapted to receive a group of plates and separators and the electrolyte, and the plates and separators are spaced from the bottom 7 by sediment bridges 9.

My improved name plate, indicated generally by the numeral 10 in Fig. 4 is formed as a unit from a suitable plastic or synthetic resin having a substantial degree of flexibility and elasticity as well as durability and adequate resistance to attack by the battery electrolyte. This plate has a main panel 11 upon which is displayed the required indicia such as a trademark and descriptive matter pertaining to the battery to be identified. Such indicia may be embossed on the panel 11 as indicated at 12. Panel 11 is adapted to extend entirely across one of the front walls 5 of the battery and has end portions 13 adapted to overlie the adjacent margins of both of the end walls 6. Flanges 14 are formed along the free ends of the name plate to engage the end walls 6 of the battery container in grooves 15 formed in these walls in spaced relation to the front wall 5 (Figs. 1 and 3). Similar name plates are shown on the oppositely disposed walls 5 of the container.

To facilitate the springing of the flanges 14 into the grooves 15 bevel surfaces 16 (Fig. 3) are formed along the front margins of the end walls 6. These bevel surfaces converge, one relative to the other forwardly, to slidably engage the flanges 14 when the name plate is applied to the front wall and forced into place on the battery container by pressure applied to the main panel 11. As shown in Fig. 4, the portions 13 of the name plate normally extend substantially at right angles to the main panel 11. These portions are sprung outward to extend obliquely to the main panel and in contact with the bevel surfaces 16 when the name plate is in place on the container, as shown in Fig. 3.

To confine the name plate against vertical movement relative to the container, detent members 17 are formed on and project from the front wall 5 of the battery container to receive the main panel 11 between them. These detent members are preferably horizontally extending shoulders adapted to abut against the upper and lower edges of the panel 11. Similar detents 17a are formed on the end walls 6 to abut against the upper and lower edges of the portions 13 of the name plate. Horizontally extending flanges 18 may be formed along the upper and lower edges of the main panel 11 to fit in grooves formed in the front wall 5 adjacent to the detent members 17.

It will be evident that the fastening of this name plate to the battery requires a minimum of time and effort. Flanges 14 are merely started in engagement with the forward margins of bevel surfaces 16 and then pressed backward to cause the members 13 to be sprung outward sufficiently to allow the flanges 14 to snap into the grooves 15 formed in the end walls. As the panel 11 is applied, its flanges 18 are placed between the detent members 17 so that plate is properly centered on the container. These flanges finally enter the horizontally extending grooves in the front wall 5. Flanges 18 impart increased rigidity to the front panel of the name plate but are not essential since the plate is securely held against movement up or down on the container by the detent members 17.

These name plates are preferably made large enough to cover a major portion of the front surface of the container, and being decorative, improve the appearance of the batteries. As indicated in Fig. 3, the underlying front wall of the container where it is covered by the name plate may be formed with spaced, parallel ridges 19, with grooves between ridges to reduce the weight of the battery container while affording adequate strength and support for the name plate. My improved name plates may be used on either or both of the walls 5 of the container. Thus, a single name plate extending across one of the main walls may be used where the display of both sides of the battery is not considered necessary.

Examples of materials which are suitable for making my improved name plates are polystyrene, methyl methacrilate and certain of the vinyl resins such as vinyl acetate. Name plates made from such materials and ranging from .04 inch to .06 inch in thickness have sufficient flexibility and elasticity to permit the plates to be snapped into place easily and retained securely and permanently in place without the use of conventional fastening means. These plates may be molded or otherwise formed as units or, in the alternative, the end portions 13 may be separately formed and assembled with the main panels 11, using suitable adhesives or solvents.

I claim:

For a storage battery, the combination with a container having a front wall and end walls, said front wall being formed with upper and lower substantially horizontally extending grooves, said end walls being formed with substantially vertically extending grooves spaced from said front wall, a name plate formed to extend across said front wall and upon adjacent marginal portions of said end walls, substantially horizontally extending flanges formed on said plate to fit in said substantially horizontally extending grooves, and flanges formed on the end portions of said name plate to engage the end walls in said substantially vertically extending grooves respectively, said name plate being sufficiently flexible and elastic to permit said last mentioned flanges to be sprung into said grooves in the end walls and to be retained therein by the elasticity of the plate.

References Cited in the file of this patent

UNITED STATES PATENTS

| | | |
|---|---|---|
| 655,197 | Cobean | Aug. 7, 1900 |
| 790,098 | Baird | May 16, 1905 |
| 1,417,325 | Hopp et al. | May 23, 1922 |
| 1,769,147 | Lennon | July 1, 1930 |
| 1,776,734 | Larche | Sept. 23, 1930 |
| 1,827,623 | Siebe | Oct. 13, 1931 |
| 2,020,780 | Hamilton | Nov. 12, 1935 |
| 2,046,745 | Hoag | July 7, 1936 |
| 2,098,478 | Young | Nov. 9, 1937 |